(12) United States Patent
Hughes et al.

(10) Patent No.: US 6,434,965 B1
(45) Date of Patent: Aug. 20, 2002

(54) APPARATUS FOR FREEZING LIQUIDS INTO LARGE BLOCKS

(76) Inventors: Mike Hughes, 6571 Ferber Rd., Jacksonville, FL (US) 32277; Al Becker, P.O. Box 13420, Ft. Pierce, FL (US) 34979

( * ) Notice: Subject to any disclaimer, the term of this patent is extended or adjusted under 35 U.S.C. 154(b) by 0 days.

(21) Appl. No.: 09/845,911

(22) Filed: Apr. 30, 2001

(51) Int. Cl.[7] ................................................ F25C 1/04
(52) U.S. Cl. ......................................... 62/356; 62/352
(58) Field of Search .......................... 62/356, 352, 353, 62/73; 249/66.1

(56) References Cited

U.S. PATENT DOCUMENTS

| | | |
|---|---|---|
| 1,449,225 A | 3/1923 | Griesser |
| 2,645,095 A | 7/1953 | Ploeger |
| 2,723,534 A | 11/1955 | Wilbushewich |
| 3,008,308 A | 11/1961 | Wilbushewich |
| 3,040,541 A | 6/1962 | Jones et al. |
| 4,404,810 A * | 9/1983 | Garland .......................... 62/73 |
| 4,601,174 A * | 7/1986 | Wilson .......................... 62/356 |
| 4,843,827 A * | 7/1989 | Peppers ........................ 62/352 |
| 5,076,069 A * | 12/1991 | Brown .......................... 62/356 |
| 5,167,132 A | 12/1992 | Meier |
| 5,345,783 A * | 9/1994 | Nishikawa .................... 62/353 |
| 5,524,451 A | 6/1996 | Tippman |
| 5,535,598 A * | 7/1996 | Cothern et al. ................ 62/356 |

* cited by examiner

Primary Examiner—William C Doerrler
Assistant Examiner—Mohammad M Ali
(74) Attorney, Agent, or Firm—Thomas C. Saitta (57) ABSTRACT

An apparatus for forming a large block of frozen liquid having vertically-disposed heat transfer tubes positioned within an open-bottom, walled mold, and elevator means to raise and lower a platform or a tray to seal with the mold as a bottom to receive and retain the liquid. Once frozen, the block is removed by lowering the platform or tray in a controlled manner.

19 Claims, 7 Drawing Sheets

APPARATUS FOR FREEZING LIQUIDS INTO LARGE BLOCKS

BACKGROUND OF THE INVENTION

This invention relates generally to the field of icemaking equipment or other similar machines for creating frozen blocks from liquid, and more particularly relates to such machines which produce a relatively large block from liquid, and in particular a large block of fruit juice or the like. The invention further relates to the mechanism for handling and transfer of the frozen block.

Machines for freezing liquids into solids are well known. Many such machines are designed to produce a large number of small frozen blocks from a liquid, such as an icemaker within a home refrigerator or a commercial apparatus for restaurants, stores and the like. Other such machines are constructed to produce a single large block of frozen material having a volume of multiple cubic feet, such as a block of frozen fruit juice, where the large block so produced is then handled, stored, transported, etc. as required. A known design comprises a large number of heat transfer tubes which are suspended from a refrigeration distribution manifold. The heat transfer tubes extend into a mold which is provided with either a hinged or removable bottom. Liquid is introduced into the mold and a refrigerant is passed through the heat transfer tubes to lower the temperature of the liquid below the freezing point. Once the liquid is frozen into a large block, the bottom is moved to open the mold and the ice is removed from the heat transfer tubes. Usually a hot gas or other fluid of elevated temperature is passed through the heat transfer tubes to produce a thin layer of liquid on the surface of the tubes, such that the frozen block does not adhere to the tubes and releases easily. The frozen block is often directed onto an inclined ramp, where it slides to a desired handling location.

An example of a freezing apparatus for producing large blocks of frozen liquid is shown in U.S. Pat. No. 5,524,451 to Tippmann. In Tippmann, a four-sided, open-top, closed-bottom container mold is provided to receive the liquid to be frozen, with a large number of heat transfer tubes positioned within the interior space of the mold. The tubes and mold are suspended a distance above the ground greater than the height of the frozen block to be produced. The container is filled with liquid and raised to a height such that the tubes are disposed within the liquid. Refrigerant gas is passed through the tubes and the liquid is frozen. The container mold is then lowered with the frozen block remaining adhered to the heat transfer tubes. A pair of inclined members pivot into position above the retracted container mold, the inclined members being separated by a distance less than the width of the frozen block. Hot gas is then passed through the heat transfer tubes, causing the frozen block to melt in the areas in contact with the tubes. The weight of the block causes it to slide downward from the tubes, such that it falls onto the inclined members and slides onto a conveyor or other handling equipment. The inclined members are removed and the container mold is then refilled with liquid, raised into freezing position, and the cycle is repeated.

Another example of a related machine is shown in U.S. Pat. No. 2,723,534 to Wilbushewich. This device is a machine to make ice blocks, where a walled mold with an open top and a hinged bottom is disposed in fixed relation to the heat transfer tubes. The mold is tapered such that the walls angle outward toward the bottom. With the bottom of the mold in the sealed position abutting the mold walls, water is introduced into the mold and refrigerant is caused to flow through the heat transfer tubes to create an ice block. Once frozen, the bottom is pivoted to the side and hot fluid is passed through the tubes to cause the ice block to release from the heat transfer tubes. It then falls onto a plate mounted onto a movable trolley, the plate being subsequently lowered such that the block and other blocks produced in adjacent molds clear the apparatus such that the trolley can be moved laterally to transport the ice blocks to a desired location.

The major drawback with the Tippmann and Wilbushewich devices, as well as with many other similar machines, is that the frozen block is allowed or required to fall from the freezing mold in a naked state and in a relatively uncontrolled manner, with subsequent handling required to place the block onto pallets or trays for further transport, handling or storage. This is especially detrimental for large blocks, such as a block of frozen juice 48 inches by 56 inches by 57 inches, which is a size suitable for placement and transport on pallets of standard size. Such blocks will weigh thousands of pounds. Additional equipment or labor steps must be employed to place the frozen block onto a tray, pallet or other bottom member so that the block can be wrapped or enclosed to prevent contamination of the product. Direct contact between the frozen block and ramps, platforms or other support members creates a need for frequent cleaning, as friction or ambient temperature effects will cause some melting of the block during the transfer motion. In addition, allowing the block to fall onto a platform or ramp subjects the block to shocks and stresses which can cause the block to crack or split, in which case the block must be removed so as not to disrupt the transport mechanisms.

It is an object of this invention to provide an apparatus which creates large blocks of frozen liquid by providing a walled mold to define an area within which are disposed multiple linear heat transfer tubes, where refrigerant is circulated through the tubes to freeze liquid delivered into the mold, with subsequent distribution of a defrosting material through the tubes to cause the block to release from the tubes, where the mold bottom for the block is raised to create a sealed junction with the mold walls, thereby defining the bottom of the mold, and where the mold bottom and frozen block are lowered in a controlled manner such that the block is not subjected to detrimental shock effects resulting from free fall, the block being removed laterally from the elevator means after the block has been fully lowered. It is a further object to provide such an apparatus where the mold bottom comprises a tray or pallet positioned on an elevator means, where the tray seals with the mold walls to receive the liquid, where once the tray and frozen block are lowered in controlled manner from the mold, the tray and block are together removed laterally from the elevator means such that the tray becomes the bottom of the container for the frozen block.

SUMMARY OF THE INVENTION

The invention comprises in general an apparatus for freezing a liquid into a large solid block and subsequently delivering the frozen block, and in particular an apparatus for creating and handling a single large block of fruit juice or the like. A relatively large number of linear heat transfer tubes are suspended vertically from distribution manifolds, where a refrigerant composition, typically a refrigerant liquid of known type such as ammonia or glycol, is directed through the tubes to freeze a liquid, and further where a defrosting fluid of elevated temperature, typically a liquid or gas, is subsequently directed through the tubes to enable the block to separate from the tubes by creating a thin layer of melted material adjacent the tubes. An open-bottom, walled mold, preferably four-sided with the sides angled slightly outward in the downward direction, is provided in a fixed position. Preferably, heat transfer tubes are also disposed within the interior of the mold walls in a serpentine configuration, the serpentine tubes likewise acting in conjunction with the linear heat transfer tubes to freeze and then heat the liquid in contact with the mold walls.

An elevator means, preferably comprising a pneumatic or hydraulic piston, is provided beneath the mold to vertically raise and lower a mold bottom member into sealed contact with the bottom edges of the mold walls. In a first embodiment, the mold bottom member is a generally planar platform component of the elevator means itself, while in a second and preferred embodiment the mold bottom member comprises a tray or pallet temporarily placed on the elevator means, the tray or pallet being removable from the elevator means.

The mold bottom is raised to seal with the bottom edges of the mold walls, and the liquid to be frozen is introduced into the mold. Refrigerant is circulated through the heat transfer tubes to freeze the liquid. When the liquid is frozen into a solid block, the hot fluid or gas is circulated through the tubes to create a thin layer of liquid on the surface of the tubes and the mold walls so that the block no longer adheres to the tubes and the mold walls. The elevator means is then lowered, or more preferably, the elevator means is provided with a passive lowering mechanism, such that the weight of the block itself causes the elevator means to lower into the fully retracted position such that the top of the block clears the bottom of the mold walls. Block removing means removes the block laterally, and in the preferred embodiment removes the tray and the block in combination, onto a conveyor or other handling system for further processing. A new tray is then positioned onto the elevator means, which is raised to seal with the mold walls and the cycle is repeated. Multiple block making apparatuses may be disposed at separate locations along a single conveyor.

DETAILED DESCRIPTION OF THE INVENTION

With reference to the drawings, the invention will now be described in detail with regard for the best mode and the preferred embodiment or embodiments. In its broadest sense, the invention is an apparatus for freezing a liquid, such as fruit juice or the like, into a solid block of relatively large dimensions having a volume of multiple cubic feet, with means to handle and deliver the frozen block to subsequent transport mechanisms, such as a conveyor or the like, for further processing, such as wrapping for storage or shipment, where the apparatus utilizes elevator means to lower the block from a suspended, open-bottom mold.

Figure 7:
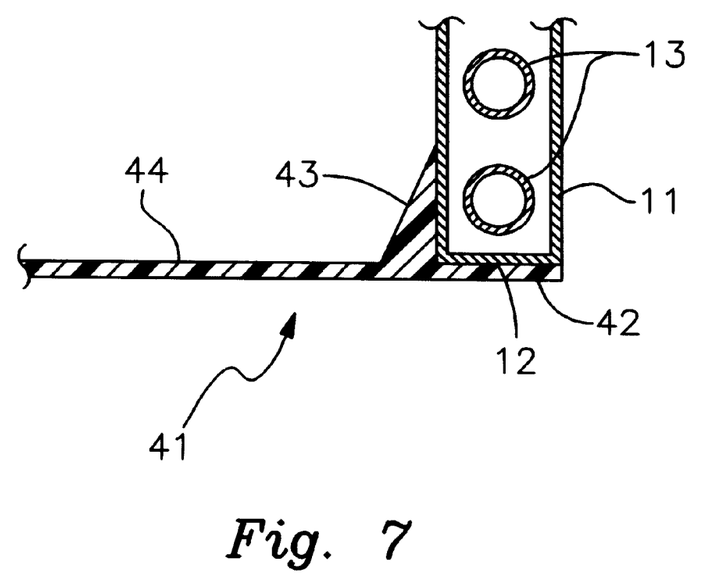
FIG. 7 is a cross-sectional view showing the removable bottom member in a sealing relationship with the bottom edge of the mold walls.

The apparatus comprises in general a frame 10 which supports mold walls 11 in suspended manner above the floor, the mold walls 11 defining part of a mold 15 and preferably forming a four-sided connected configuration having an open bottom, such that a bottom sealing edge 12 is presented beneath each mold wall 11, as shown generally in FIGS. 1 through 4. The mold walls 11 most preferably angle slightly outward from top to bottom, such that the area at the top of the mold walls 11 is slightly smaller than the area at the open bottom. The mold walls 11 are preferably hollow and structured to receive wall heat transfer members 13, as shown in FIGS. 5 and 7, which may comprise a serpentine conduit composed of a metal with high thermal transfer properties, such that refrigerant and defrosting fluid or gas may be routed through the wall heat transfer members 13 to lower or raise the temperature of the mold walls 11 themselves as desired.

Means to reduce and preferably also elevate the temperature within the mold 15 are provided, and preferably comprise an array of plural linear heat transfer members 21 depending from refrigerant distribution manifolds 22 and refrigerant suction manifolds 23 located above the mold walls 11, the linear heat transfer members 21 extending vertically down into the interior defined by the mold walls 11. A relatively large number of linear heat transfer members 21 are provided in order to insure sufficient freezing of the liquid in a relatively short time period. For example, in an apparatus where the mold walls 11 in combination define a 48 inch by 56 inch horizontal rectangle, it has been found suitable to provide approximately 352 one inch diameter linear heat transfer members 21 in an evenly spaced 16 by 22 array.

Elevator means 30 are provided to vertically position a mold bottom member 31 beneath the mold walls 11, the elevator means 31 being of sufficient rigidity to support the weight of the liquid and the frozen block 99. Elevator means 30 may comprise hydraulic or pneumatic cylinders 34 either attached to the frame 10 or separately supported. The mold bottom 31 is a separate member from the mold walls 11, and may comprise a generally planar platform member 32 formed as a fixed component of the elevator means 30, as shown in FIG. 5, but preferably comprises a removable tray or pallet member 41 which is placed onto elevator means 30. Preferably, roller members 33, either free rolling or powered, are provided as part of the elevator means 30 to provide for easier lateral movement of the tray member 41 and frozen block 99. The elevator means 30 raises the independent mold bottom 31, either the platform member 32 or the tray member 41, into sealing contact with the bottom edges 12 of the mold walls 11 to define the mold 15, such that liquid is prevented from passing through the junction between the platform member 32 or tray member 41 and the mold walls 11. Once the liquid has been frozen into a solid block 99, the elevator means 30 is used to lower the mold bottom member 31 and frozen block 99 until the top of the frozen block 99 is beneath the bottom edges 12 of the mold walls 11, such that the block 99, and tray member 41 if present, can be removed laterally from the elevator means 30. Most preferably, the elevator means 30 is structured such that the block 99 is lowered by gravity effect alone, such as by providing bleed valves on the cylinders 34 which are opened when the liquid is fully frozen, the weight of the block 99 causing the cylinders 34 to allow the block 99 descend.

Preferably, block removing means 50 are incorporated into the frame 10, or separately mounted in secure fashion, such that the block 99, or the block 99 and tray member 41, may be moved laterally from beneath the mold walls 11. As shown, block removing means 50 may comprise a generally U-shaped wall or plow member 52 which is moved by hydraulic or pneumatic cylinders 51, such that the block 99 is pulled or pushed from the platform member 32, or most preferably such that the block 99 and tray member 41 together are pulled or pushed from atop the roller members 33, onto a conveyor or other transport means 98 for further handling, such as for example wrapping in polymer film for storage or transfer.

The linear heat transfer members 21 are adapted to remove heat from the liquid placed into the mold defined by the combination of mold walls 11 and platform member 32, or mold walls 11 and tray member 41, in order to freeze the liquid into a frozen block 99, as well as to deliver heat to the frozen block 99 in order to eliminate adhesion of the block 99 to the outer surface of the linear heat transfer members 21 so that the block 99 will release downward due to its weight. As shown in FIG. 5, a preferred embodiment for the linear heat transfer members 21 is shown as comprising an outer tubular member 24 having a closed lower end 25 and composed of stainless steel or like material with good heat transfer properties. The closed lower end 25 is preferably disposed very close, approximately one quarter inch for example, to the bottom 44 of the tray member 41 or the platform member 32 when the tray member 41 or platform member 32 is in sealing contact with the bottom edges 12 of the mold walls 11. This minimizes the amount of liquid directly beneath the lower ends 25 and insures that the outer tubular members 24 will not be deflected or flexed by expansion of the liquid directly beneath the lower end 25 during freezing. An interior delivery member 26, preferably tubular as well, is disposed coaxially within the outer tubular member 24, extending to near the lower end 25 of the outer tubular member 24. One or more flow apertures 27 are provided at the lower end of the interior delivery member 26 to allow refrigerant or defrosting fluid, either liquid or gas to be delivered through the interior delivery member 26 and into outer tubular member 24. Preferably, the lower end 25 is provided with a retainer cap member 28 which acts to secure and align the interior delivery tube 26 relative to the outer tubular member 24 without impeding flow through the apertures 27. The upper ends of the outer tubular members 24 are joined in fluid communicating manner to one of plural refrigerant suction manifolds 23 which provide a communicating passage for refrigerant to be drawn from the outer tubular member 24 and for delivery or removal of defrosting fluid, depending on the particular flow paths of the refrigerant and defrosting fluid flow system 70. The upper ends of the interior delivery members 26 extend through the suction manifolds 23 and are joined in fluid communicating manner to one of plural refrigerant delivery manifolds 22, which provide passages for refrigerant to be conducted into the interior delivery member 26 and for delivery or removal of defrosting fluid. The delivery manifolds 22 and suction manifolds 23 are connected to a refrigerant and defrost fluid delivery and suction system. Where heat transfer members 13 are provided in the mold walls 11, the heat transfer members 13 are also connected to the refrigerant and defrosting fluid flow system 70 such that refrigerant liquid can be delivered to cool down the mold walls 11 and defrosting gas can be delivered to elevate the temperature of the mold walls 11.

Figure 6:
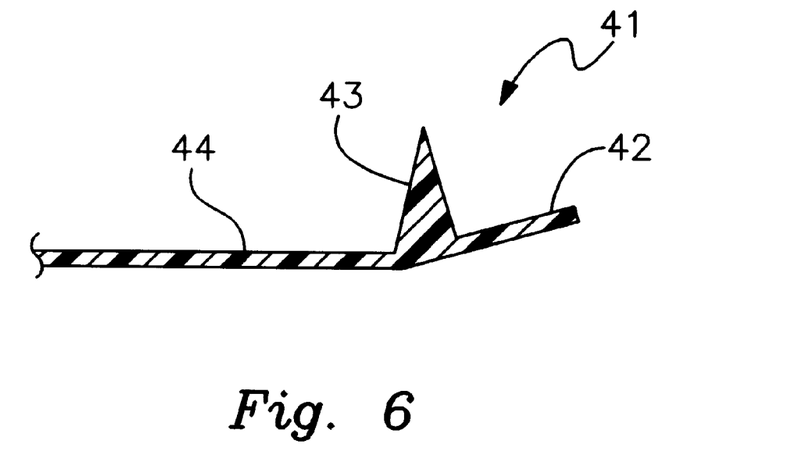
FIG. 6 is a cross-sectional view of a portion of the removable bottom member.

In the preferred embodiment, a tray member 41 is provided to receive and retain the block 99, the tray member 41 comprising a bottom 44 and a peripheral sealing flange member 43 located around the perimeter of the bottom member 44. A peripheral angled flange 42 is provided externally to the sealing flange member 43, such that the angled flange member 42 extends upward from horizontal in the passive state, as shown in FIG. 6. Alternatively, the tray member 41 could be provided with short side walls, where the sealing flange member 43 is located on the side walls. The sealing flange member 43 and angled flange member 42, and preferably the entire tray member 41, are composed of a plastic material which is slightly flexible and possibly slightly compressible, such that a liquid impermeable seal is formed by contact between the sealing flange member 43 and the mold walls 11, the angled flange member 42 being preferably sized to fit within mold walls 11. When the tray member 41 is elevated to contact the mold walls 11, the angled flange member 42 encounters the bottom edges 12 of the mold walls 11, which causes the sealing flange member 43 to flex outward so as to be compressed against the mold walls 11, as shown in FIG. 7, thereby insuring a positive seal.

Figure 8:
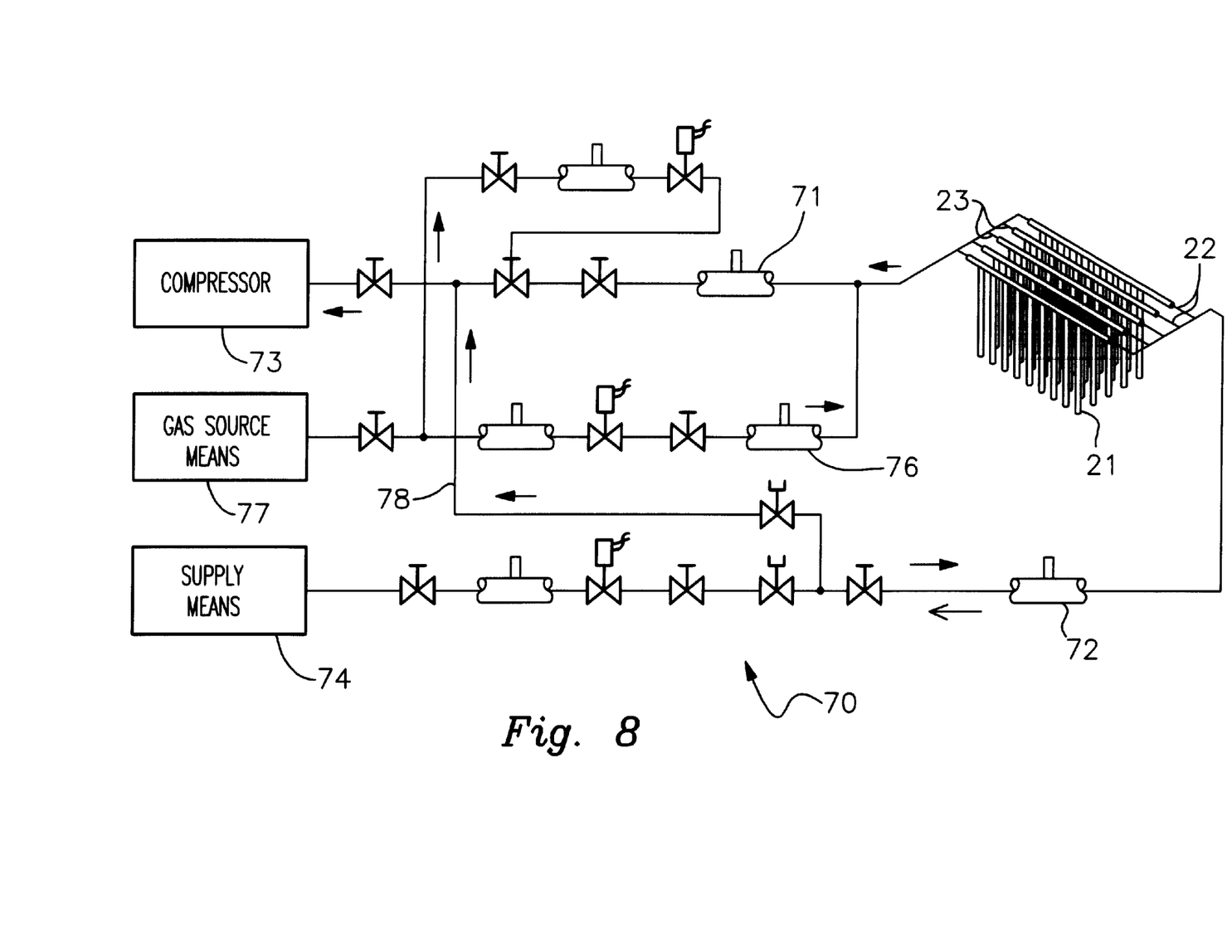
FIG. 8 is a representation of the refrigerant and defrosting fluid flow system.

A preferred refrigerant and defrost flow system 70 is illustrated in FIG. 8, although other systems known to the industry may be utilized. Refrigerant suction conduits 71 connect the refrigerant suction manifolds 23 to a compressor means 73 and refrigerant delivery conduits 72 connect the refrigerant delivery manifolds 22 to refrigerant supply tanks 74. Suitable control mechanisms 75, such as solenoids and check valves, control delivery of refrigerant to the linear and wall heat transfer members 21 and 13. A defrosting fluid delivery conduit 76 is connected to the refrigerant suction conduit 71 between the control mechanisms 75 and the suction manifolds 23 to deliver defrosting fluid from defrosting fluid supply source means 77. A bypass conduit 78 connects the refrigerant suction conduit 72 to the refrigerant suction conduit 71, and a suction direction control mechanism 79 is provided to control the direction of flow through the refrigerant suction and delivery conduits 71 and 72. To freeze liquid within the apparatus, low temperature refrigerant is delivered from the supply tanks 74 through refrigerant delivery conduit 72, into the linear and wall heat transfer members 21 and 13 and then withdrawn through refrigerant suction conduit 71 by the compressor 73. To defrost the surface of the linear transfer tubes 21 and the mold walls 11, the elevated temperature defrosting fluid is delivered into the refrigerant suction conduit 71, into the linear and wall heat transfer members 21 and 13 and then withdrawn through refrigerant delivery conduit 71 and bypass conduit 78 by the compressor 73, the suction direction control mechanism 79 having closed the refrigerant suction conduit 71 at a point between the inflow junction for the defrosting fluid and return junction for the defrosting fluid.

Figure 1:
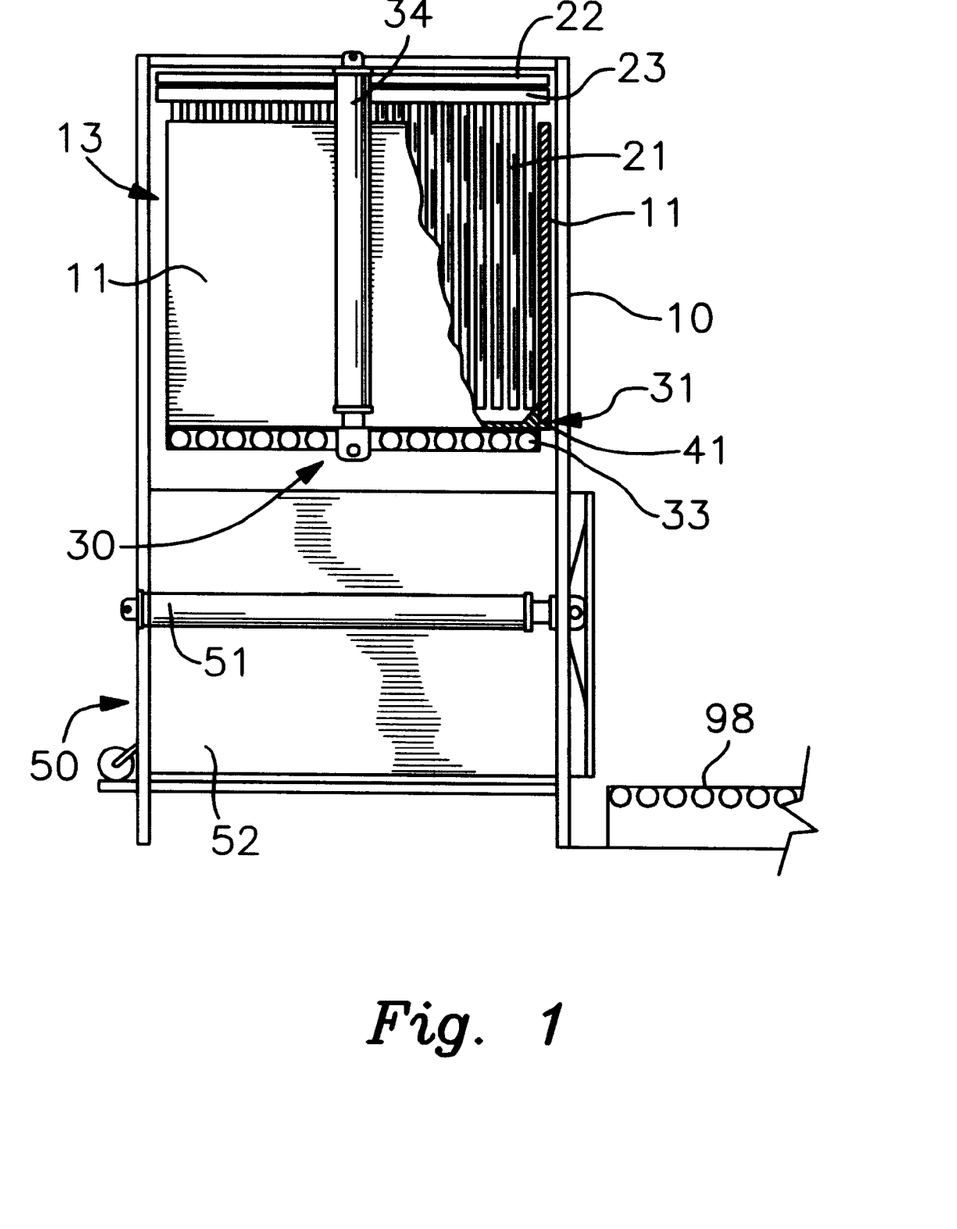
FIG. 1 is a partially exposed view of the apparatus with the elevator means in the raised position with the bottom member forming a sealed junction with the mold walls.
Figure 2:
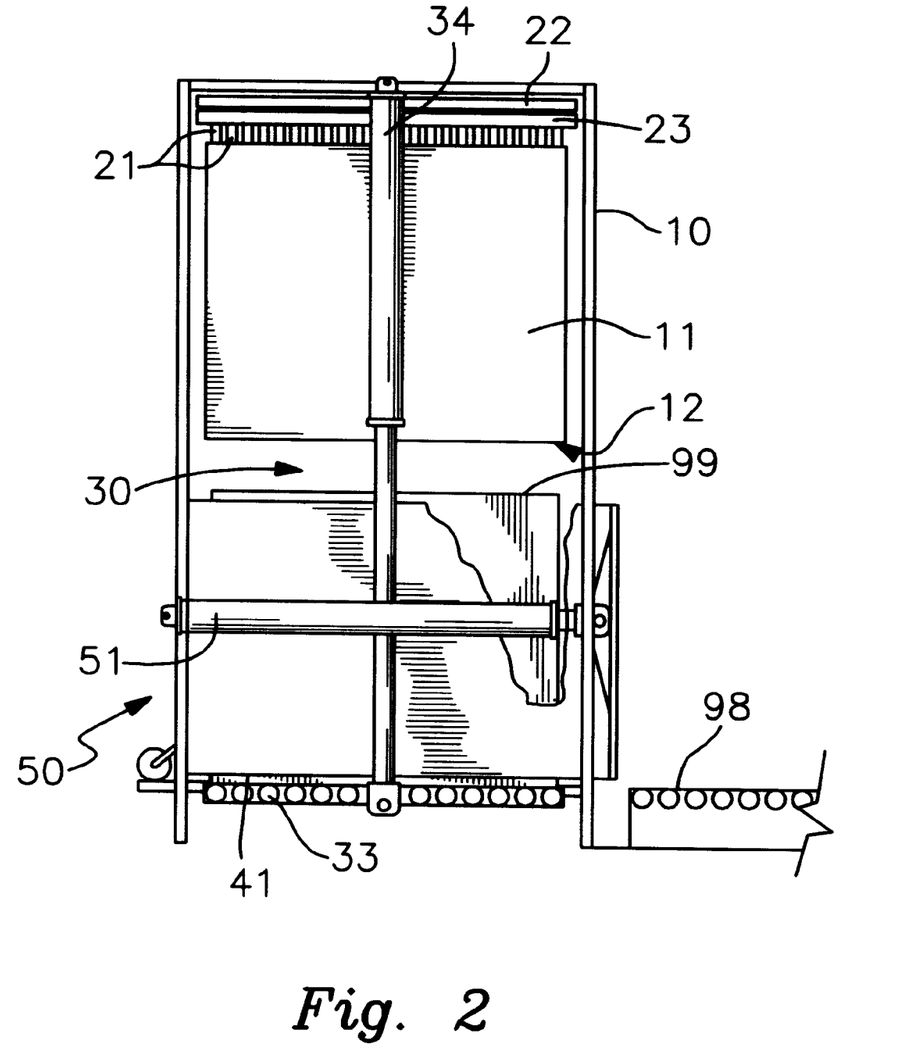
FIG. 2 is a view of the apparatus with the elevator means and frozen block in the lowered position.
Figure 3:
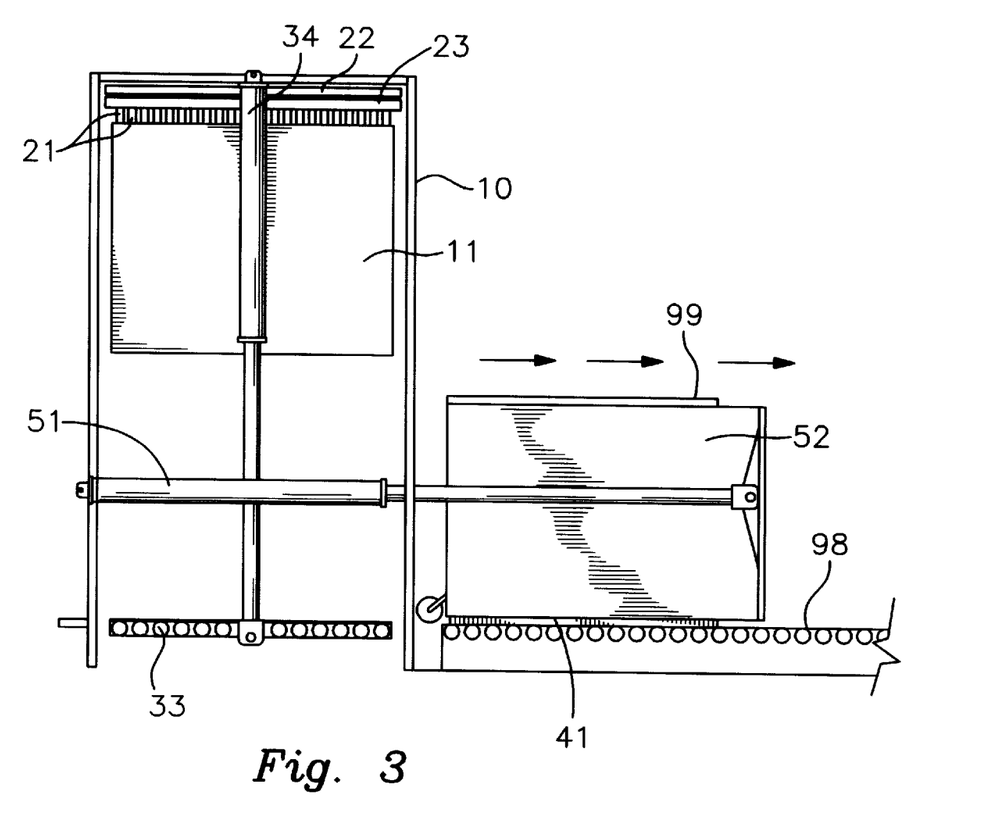
FIG. 3 is a view of the apparatus with the block laterally shifted onto the conveyor means.
Figure 4:
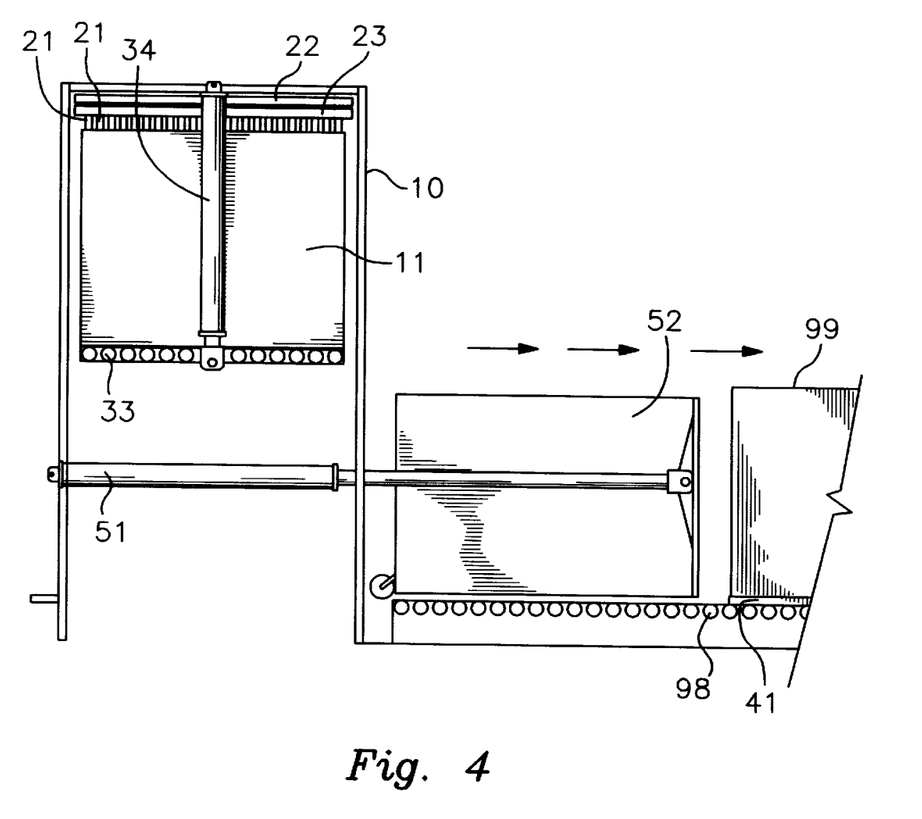
FIG. 4 is a view of the apparatus with the elevator means in the raised position prior to retraction of the block moving means.
Figure 5:
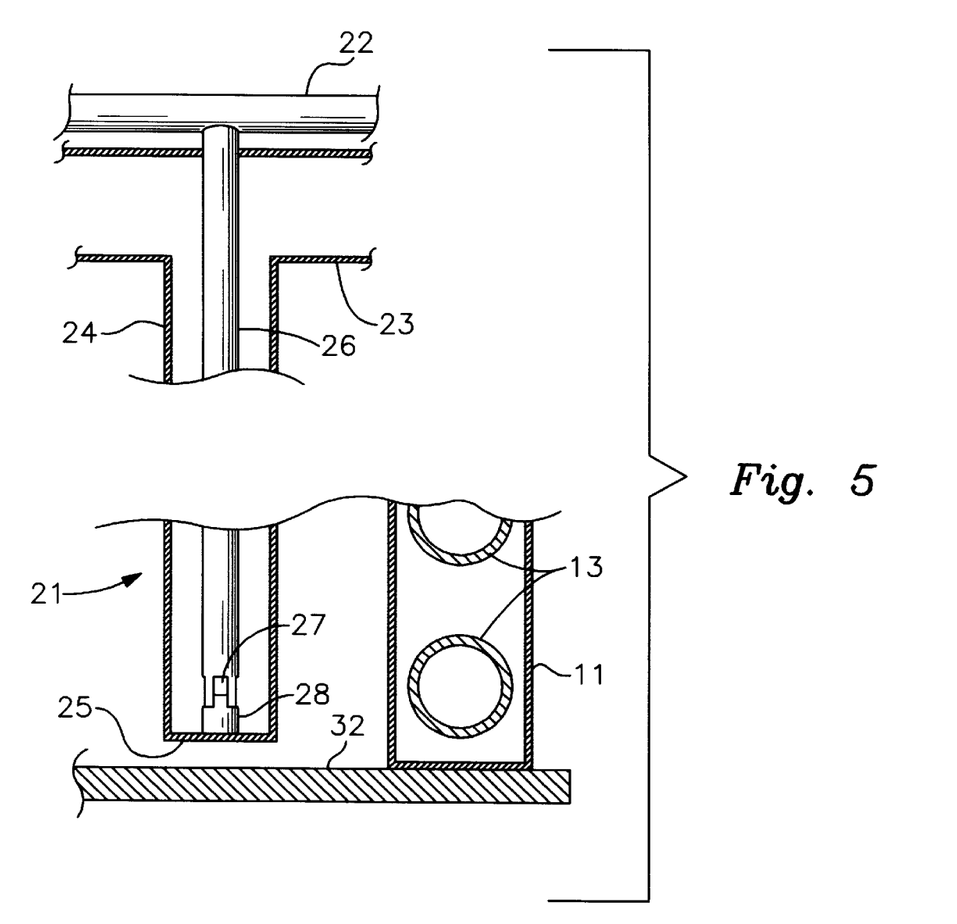
FIG. 5 is a cross-sectional view of a linear heat transfer tube, a portion of a distribution manifold, and a portion of a mold wall.

The cycling operation of the invention is shown in FIGS. 1 through 4. In FIG. 1, elevator means 30 is shown in the raised position, such that the tray member 41 is sealed against the mold walls 11. Liquid, such as orange juice or the like, is introduced into the mold area defined by the combination of the mold walls 11 and the tray member 41 by standard delivery means, not shown, to a level which allows room for vertical expansion as the liquid freezes. Preferably the filling process is controlled automatically. Preferably as the mold is filling with liquid, refrigerant liquid at approximately −45 degrees F. is introduced into the linear heat transfer members 21 and into the serpentine wall heat transfer members 13 to freeze the juice into a block 99. The process is monitored and refrigerant delivery is halted when the liquid is detected to be sufficiently frozen, and remaining refrigerant is pumped from the linear and wall heat transfer members 21 and 13. High pressure refrigerant gas is supplied as the defrosting fluid and is fed backwards through the linear and wall heat transfer members 21 and 13. This elevates the temperature of the linear and wall heat transfer members 21 and 13 above freezing and melts the block 99 at the contact surfaces to eliminate adhesion of the block 99 to the linear heat transfer members 21 and mold walls 11. At this time the elevator means 30 is lowered or is set into a passive condition that allows the block 99 to self-lower a sufficient distance so as to be able to clear the mold walls 11 laterally, as shown in FIG. 2. The block removing means 50 is initiated and the block 99, and tray 41 if present, is pulled from the elevator means 30 onto the conveyor means 98, as shown in FIG. 3. The elevator means 30 then elevates the mold bottom 31 to seal with the mold walls 11, as shown in FIG. 4, and the block removal means 50 is retracted to its ready position, and the cycle is repeated.

It is to be understood that some equivalents and substitutions for certain elements set forth above may be obvious to those skilled in the art, and thus the true scope and definition of the invention is to be as set forth in the following claims.

We claim:

1. An apparatus for freezing liquid into a block, said apparatus comprising:

a mold adapted to receive liquid and comprising mold walls and a mold bottom, said mold bottom being fully separable from said mold walls;

means to lower the temperature within said mold to freeze a liquid placed into said mold to form a frozen block; and elevator means to vertically raise said mold bottom into sealing contact with said mold walls, and to vertically lower said mold bottom and said frozen block from said mold walls.

2. The apparatus of claim 1, wherein said means to lower the temperature within said mold comprises linear heat transfer members vertically disposed within said mold, said linear heat transfer members adapted to receive a refrigerant.

3. The apparatus of claim 1, wherein said mold bottom comprises a removable tray member placed onto said elevator means.

4. The apparatus of claim 3, wherein said tray member comprises a bottom and a peripheral sealing flange which mates with said mold walls when said mold bottom is raised into sealing contact by said elevator means.

5. The apparatus of claim 4, wherein said tray further comprises a peripheral angled flange member externally disposed relative to said peripheral sealing flange, where said peripheral angled flange member is disposed upward from horizontal in a passive state, such that contact with said mold walls when said mold bottom is raised causes said peripheral sealing flange to compress against said mold walls.

6. The apparatus of claim 1, further comprising wall heat transfer members disposed within said mold walls.

7. The apparatus of claim 1, further comprising means to elevate the temperature within said mold.

8. The apparatus of claim 7, wherein said means to elevate the temperature within said mold comprises linear heat transfer members vertically disposed within said mold, said linear heat transfer members adapted to receive a hot gas.

9. The apparatus of claim 1, further comprising block removing means for removing said block from said elevator means.

10. The apparatus of claim 3, further comprising block removing means for simultaneously removing said tray member and said block from said elevator means.

11. The apparatus of claim 1, wherein said elevator means comprises at least one cylinder operated either hydraulically or pneumatically.

12. The apparatus of claim 2, wherein said linear heat transfer members each comprise an interior delivery member having at least one flow aperture and disposed coaxially within an outer tubular member having a closed end.

13. The apparatus of claim 12, further comprising at least one delivery manifold for delivering refrigerant to said interior delivery members and at least one suction manifold for removing refrigerant from said outer tubular members.

14. The apparatus of claim 3, wherein said elevator means further comprises roller members, and wherein said tray member is placed onto said roller members.

15. The apparatus of claim 10, wherein said block removing means comprises at least one cylinder operated either hydraulically or pneumatically.

16. An apparatus for freezing liquid into a block, said apparatus comprising:

a mold comprising mold walls defining an open bottom and an independent mold bottom, wherein said mold bottom comprises a removable tray member adapted to sealingly mate with said mold walls to receive liquid to be frozen;

means to lower the temperature within said mold to freeze a liquid placed into said mold to form a block; and elevator means to vertically raise said mold bottom into sealed contact with said mold walls, and to vertically lower said mold bottom and said frozen block from said mold walls.

17. The apparatus of claim 16, wherein said elevator means further comprises roller members, such that said removable tray is placed onto said roller members.

18. A method of forming a frozen block from liquid, comprising the steps of:

providing a mold comprising mold walls defining an open bottom and an independent mold bottom, wherein said mold bottom comprises a removable tray member adapted to sealingly mate with said mold walls to receive liquid to be frozen;

providing means to lower the temperature within said mold to freeze a liquid placed into said mold to form a block;

providing elevator means to vertically raise said mold bottom into sealed contact with said mold walls, and to vertically lower said mold bottom and said frozen block from said mold walls;

placing said removable tray onto said elevator means, raising said removable tray to sealingly mate with said mold walls, introducing liquid into said mold, reducing the temperature within said mold until said liquid becomes a frozen block, and lowering said removable tray and said frozen block from said mold.

19. The method of claim 18, further comprising the steps of providing block removing means, and removing said tray member and said frozen block laterally after said tray member and said frozen block have been lowered from said mold.

* * * * *